Figure 1:
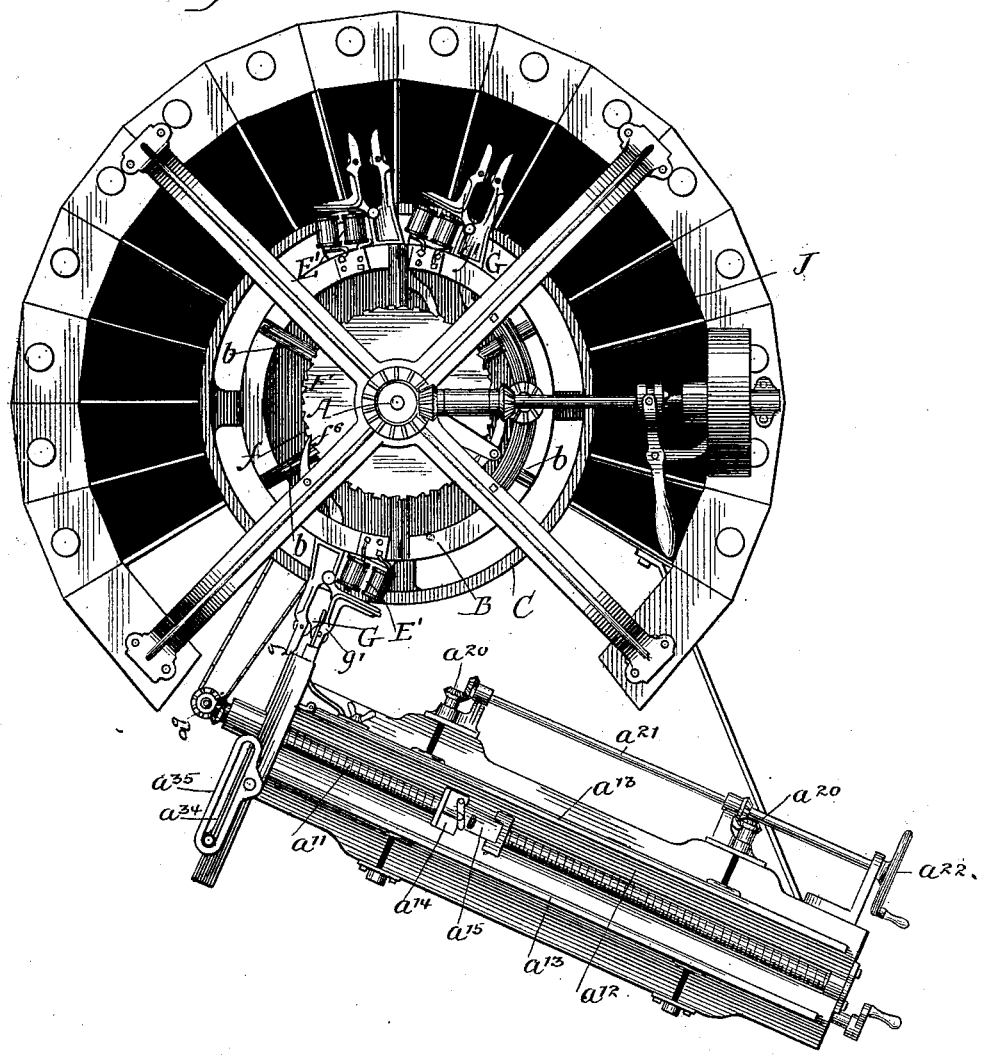

(No Model.) 8 Sheets—Sheet 1.

F. BAIN.
LEATHER MEASURING MACHINE.

No. 425,925. Patented Apr. 15, 1890.

Witnesses:
Geo. E. Curtis.
Emma Hack.

Inventor:
Foree Bain
by Munday Evarts & Adcock
his Attorneys (No Model.) 8 Sheets—Sheet 3.
F. BAIN.
LEATHER MEASURING MACHINE.

No. 425,925. Patented Apr. 15, 1890.

Witnesses
Lew. E. Curtis.
Emma Hack.

Inventor:
Foreê Bain
By Munday Evarts & Adcock
Attorney (No Model.) 8 Sheets—Sheet 4.
F. BAIN.
LEATHER MEASURING MACHINE.
No. 425,925. Patented Apr. 15, 1890.
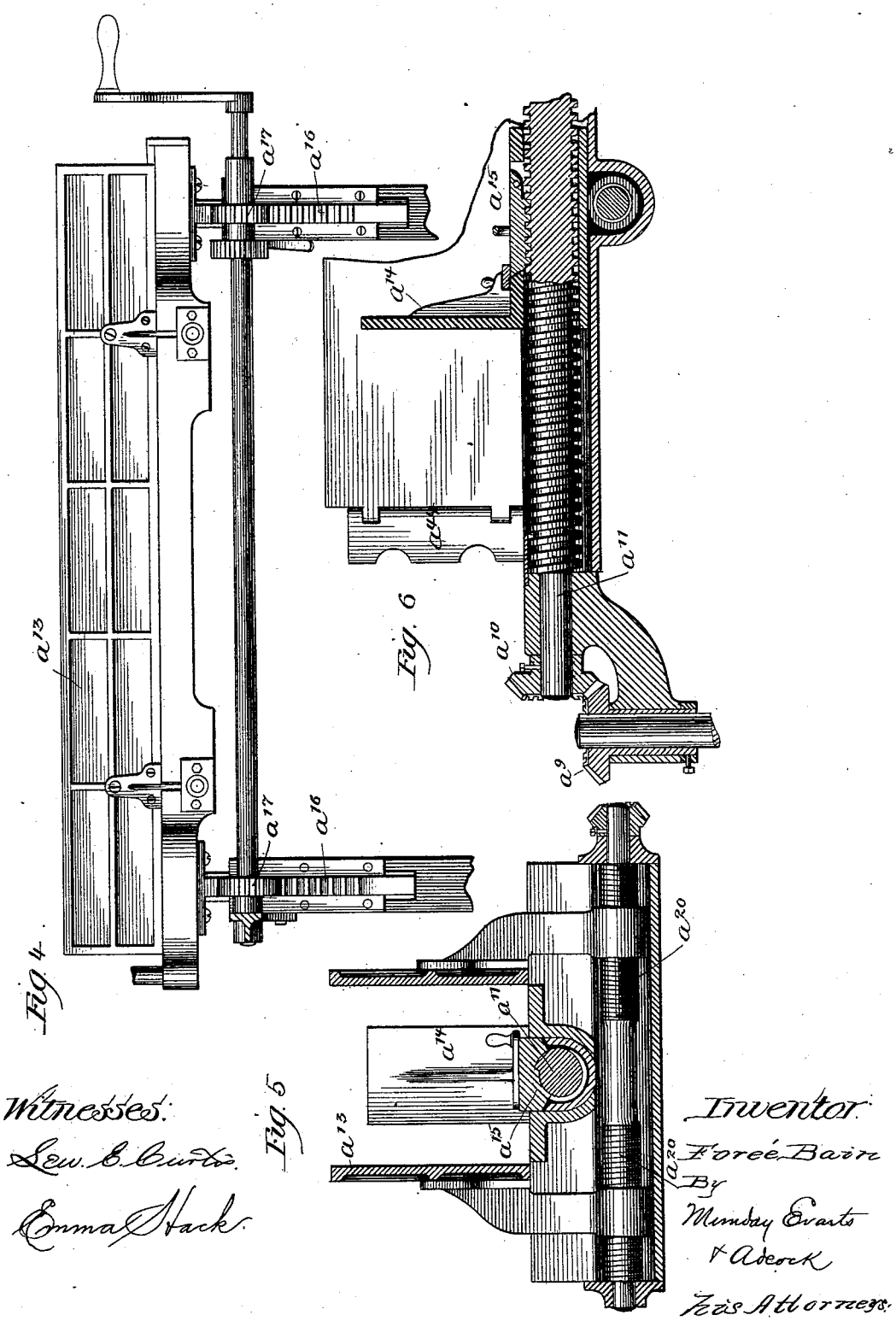

(No Model.) 8 Sheets—Sheet 5.
F. BAIN.
LEATHER MEASURING MACHINE.

No. 425,925. Patented Apr. 15, 1890.

Witnesses:
Lew. C. Curtis.
Emma Hack.

Inventor:
Force Bain
By Munday Evarts & Adcock
his Attorneys.

(No Model.)  8 Sheets—Sheet 6.
F. BAIN.
LEATHER MEASURING MACHINE.
No. 425,925.  Patented Apr. 15, 1890.
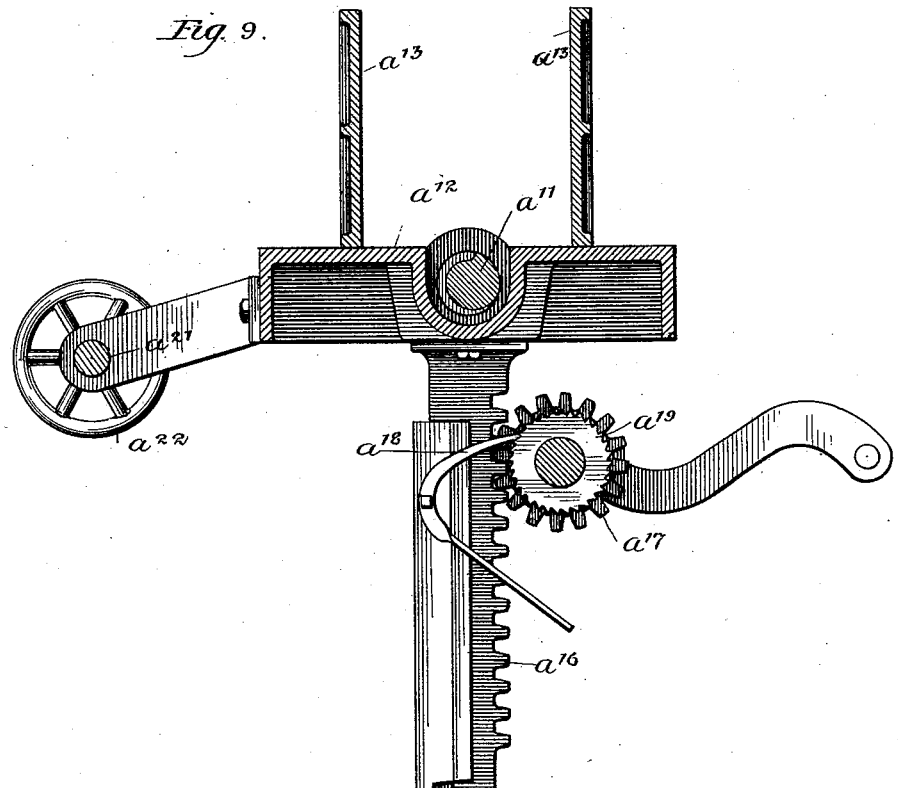
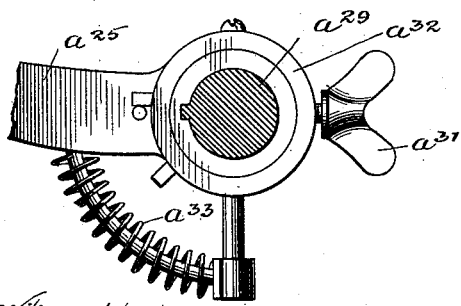
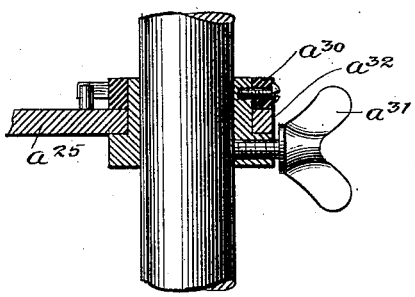

(No Model.) 8 Sheets—Sheet 7.
F. BAIN.
LEATHER MEASURING MACHINE.
No. 425,925. Patented Apr. 15, 1890.
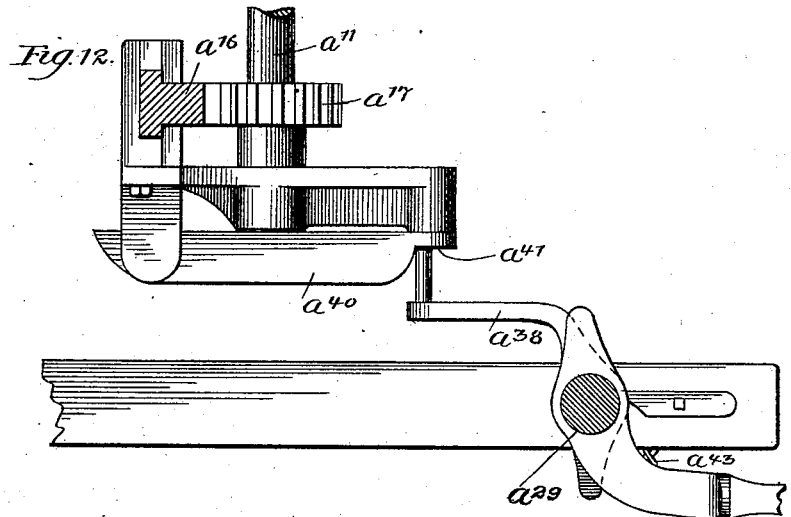
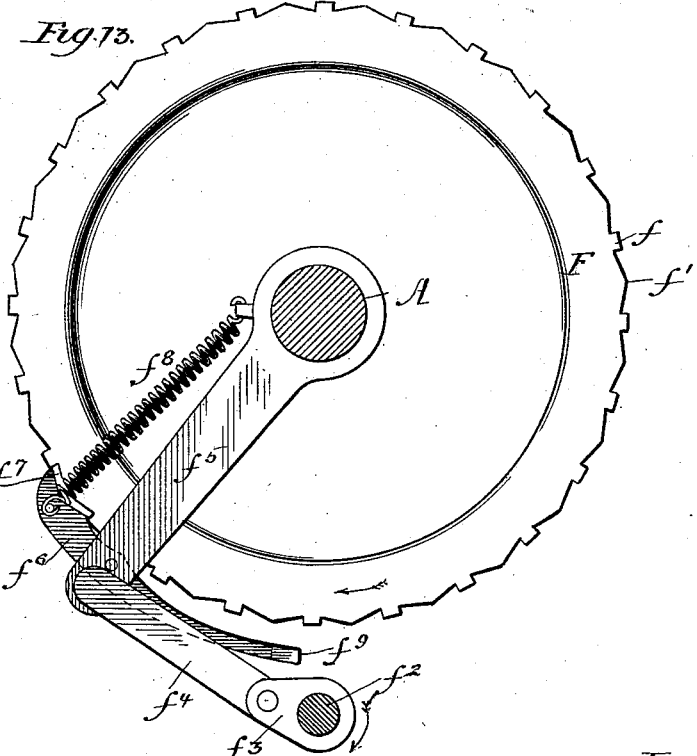
Witnesses:
Lew. E. Curtis.
Emma Hack.
Inventor:
Forée Bain
By Munday Evarts & Adcock
His Attorneys.

(No Model.) 8 Sheets—Sheet 8.
F. BAIN.
LEATHER MEASURING MACHINE.
No. 425,925. Patented Apr. 15, 1890.
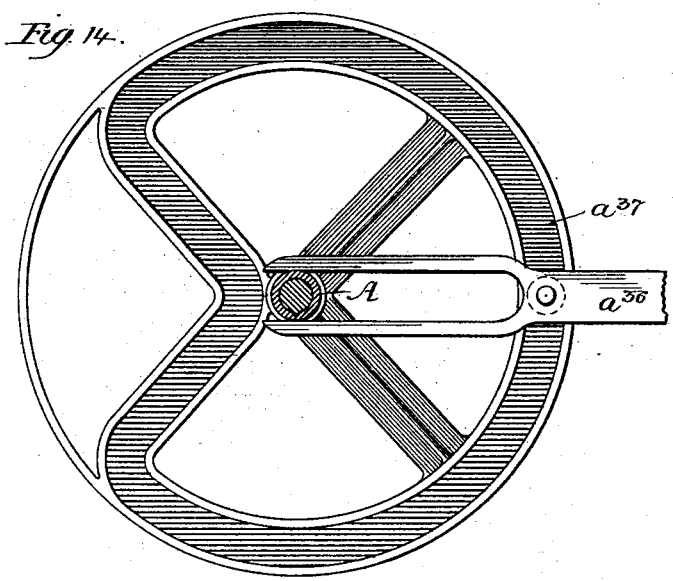
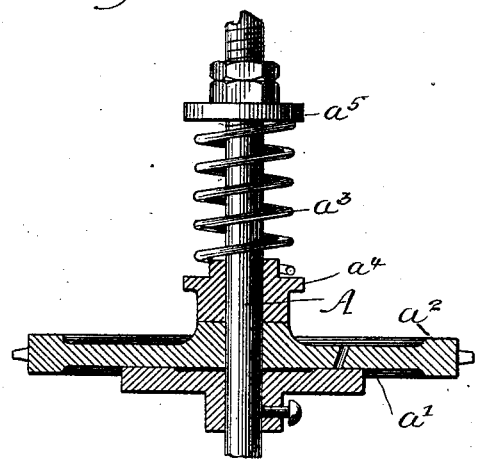
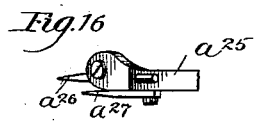
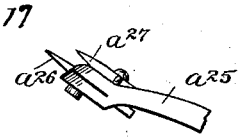
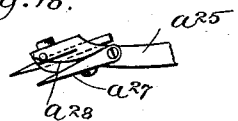
Witnesses:
Lew. C. Curtis
Emma Hack
Inventor:
Force Bain
By Munday Evarts & Adcock
His Attorneys

UNITED STATES PATENT OFFICE.

FORÉE BAIN, OF CHICAGO, ILLINOIS.

LEATHER-MEASURING MACHINE.

SPECIFICATION forming part of Letters Patent No. 425,925, dated April 15, 1890.

Application filed July 17, 1889. Serial No. 317,760. (No model.)

*To all whom it may concern:*

Be it known that I, FORÉE BAIN, a citizen of the United States, residing at Chicago, in the county of Cook and State of Illinois, have invented a new and useful Improvement in Leather-Measuring Machines, of which the following is a specification.

This invention relates to a machine for automatically calipering or measuring the thickness of leather tap and sole blanks and assorting the same according to thickness.

The nature of the invention is to measure the thickness of each piece by feeding the same between the jaws of one of a series of moving calipers. An extension of one of the arms of the caliper laterally from the line of its path indicates the thickness of the piece between its jaws, and a series of points arranged along the line of the path of the caliper and at different distances from said line, by contact with the arm of the caliper, cause the jaws to open and drop the piece of leather into a bin or receptacle located opposite to the particular point or projection which by its position has been encountered by the extended arm of the caliper. A suitable feed automatically thrusts a piece of the leather to be measured into the jaws of each caliper of the series as it passes a given point. The calipers carry the pieces in their grip, the measurement being indicated by the position of an arm connected to one of the jaws. When the piece of leather has reached that point in the path of the calipers devoted to its particular thickness, the indicating-arm comes in contact with the measuring point or projection located at the required particular distance from said path, causing the calipers to open and drop the leather into the bin. In order to secure rapidity and certainty of action and the necessary accuracy, the agency of electricity is employed to open the caliper by means of a circuit closed by the contact of the indicating-arm with the measuring projection, which energizes an electro-magnet, the armature of which is connected to the movable jaw of the caliper.

The invention also relates to sundry mechanisms and features of construction and arrangement, which will be more fully apparent from the subjoined description and claims and from the accompanying drawings, forming a part of this specification, in which like letters of reference denote the same parts in the several figures, and in which—

Figure 2:
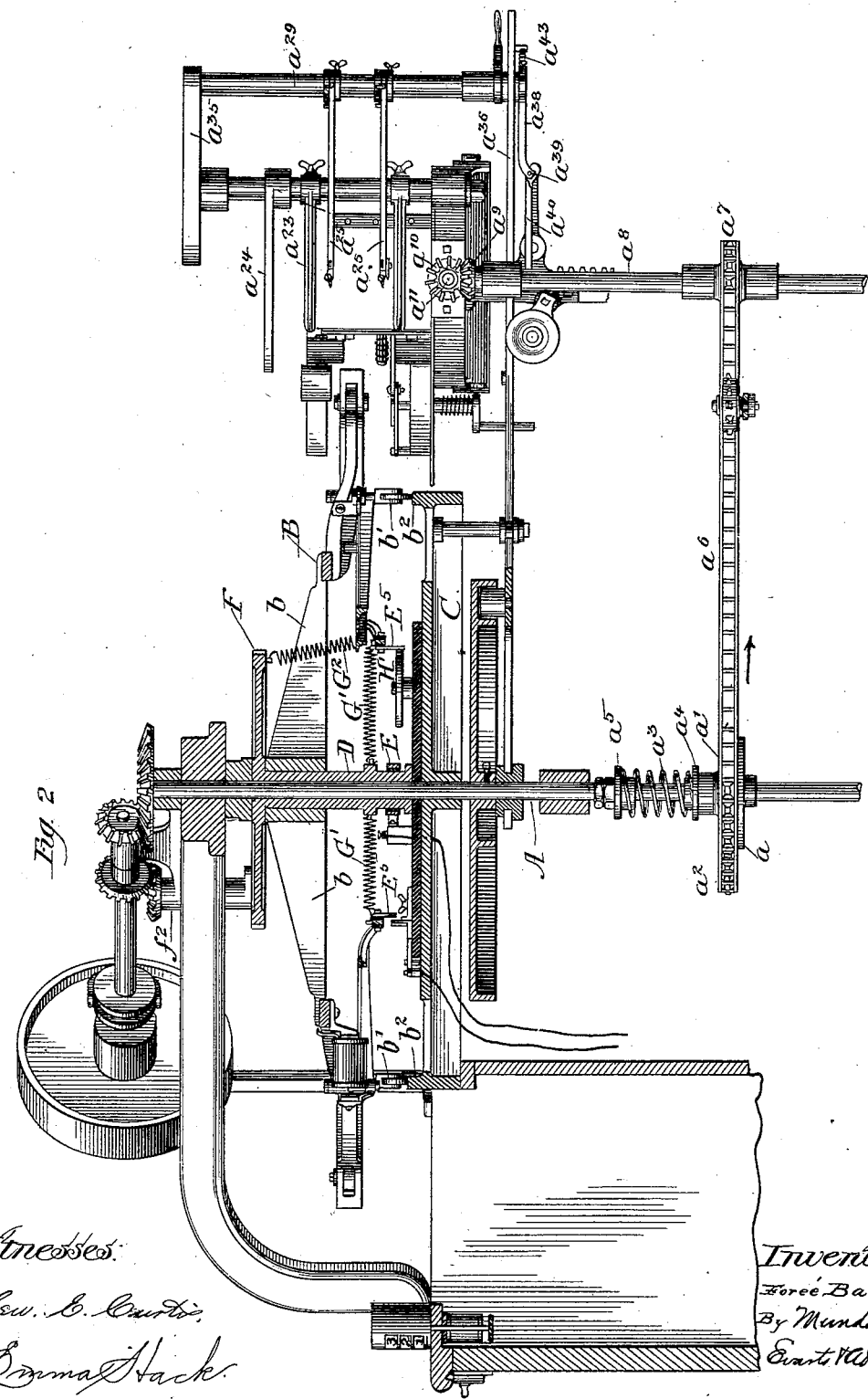
Figure 3:
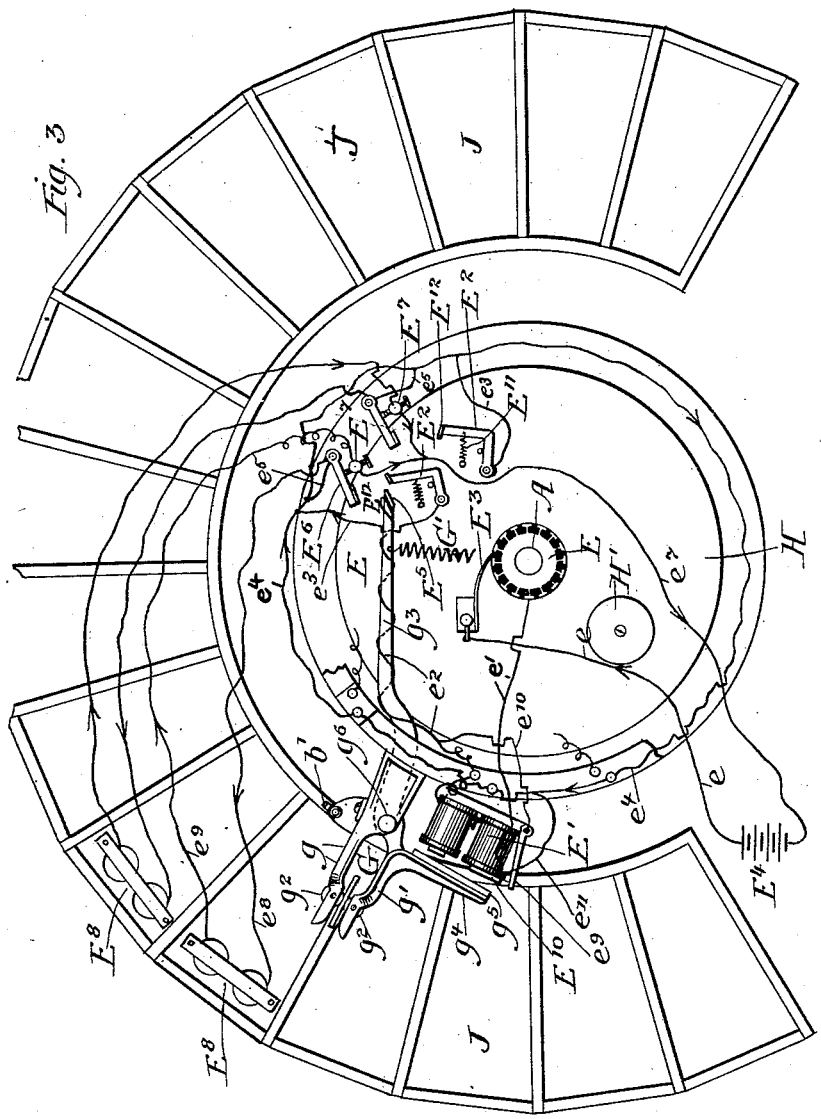
Figure 7:
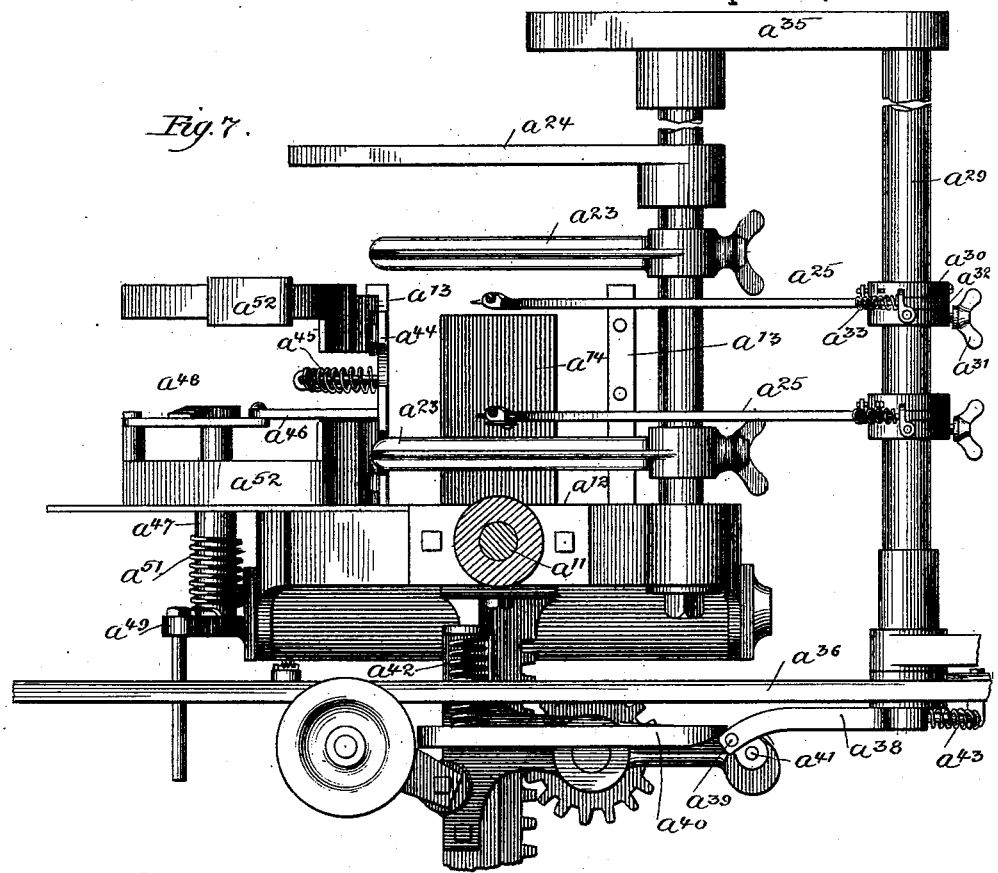
Figure 8:
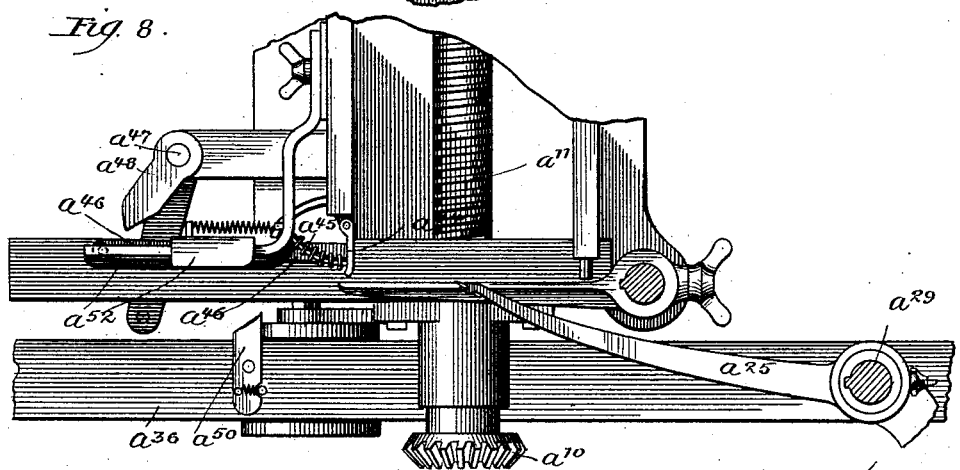

Figure 1 is a top or plan view of the machine. Fig. 2 is a vertical section of the same. Fig. 3 is a plan diagram of the electrical circuits. Fig. 4 is a side elevation of the feed-box. Fig. 5 is a vertical cross-section of the same. Fig. 6 is a longitudinal section of the feed-box. Fig. 7 is an end view of the feeding mechanism for transferring the leather pieces from the feed-box to the calipers. Fig. 8 is a plan view of the same. Fig. 9 is an end view of the feed-box, showing the device for raising the same. Fig. 10 is a plan view of the rock-shaft which carries the feeding-fingers. Fig. 11 is a sectional view of the collars which attach such fingers to the rock-shaft. Fig. 12 is a plan view of the rock-shaft and a portion of its actuating mechanism. Fig. 13 is a plan view of the ratchet-wheel and mechanism for operating the same, which gives motion to the caliper-carriage. Fig. 14 is a plan view of the heart cam-wheel which gives reciprocating motion to the feeding-fingers. Fig. 15 is an enlarged sectional detail view of the friction rag-wheel. Figs. 16, 17, and 18 are respectively side, top, and bottom views of the spiked feeding-fingers.

The material to be operated upon, pieces cut out of sole-leather in the form of taps or soles, is not an easy material to be handled by machinery automatically, owing to the fact that the leather is not flat, but more or less curled, warped, and crinkled as it comes from the dies, and is stiff enough to obstinately retain such deviations from the flat or plain condition which it may have originally possessed in the side as it came from the tannery. This makes it desirable that the pieces in order to be fed with accuracy shall be in a row or pile under compression. The pieces are of different sizes, and it is desirable to caliper each piece at about the center, in order to get thereby its true average or mean thickness, and for that reason it is desirable to have the feed adjustable, so that the pieces of sole-leather will be thrust into the calipering-jaws accurately. This feed mechanism constitutes an important adjunct to or element of the machine and will now be described.

Upon a continually-revolving shaft, and which may preferably be the vertical central shaft A of the machine, I mount rigidly a friction-disk $a$, (shown in detached view at Fig. 15,) and loosely in contact with said friction-disk a second friction-surface $a'$, made one with the rag-wheel $a^2$. A spring $a^3$, interposed between the collar $a^4$ of the disk and rag-wheel, and a collar $a^5$, secured to the shaft A, serve to press the friction-disks together and impart the motion of the shaft A to the rag-wheel, except when resistance above a certain amount is applied to the rag-wheel. Motion from this friction-driven rag-wheel is conveyed by an endless chain $a^6$ to a pinion $a^7$ on the counter-shaft $a^8$, and from thence by beveled gearing $a^9$ $a^{10}$ to a screw-shaft $a^{11}$. This screw-shaft $a^{11}$ is mounted to revolve in the bottom of the feed-box, which is adapted to contain a row of the pieces of leather placed surface to surface in an upright position. Said feed-box consists of a bottom $a^{12}$ and two sides $a^{13}$ $a^{13}$. Mounted to travel upon the screw in the feed-box is a platen or follower $a^{14}$. The half-nut $a^{15}$, which drives the follower or platen, is made removable or hinged, so that it may be lifted out of engagement with the screw, in order to set the follower or platen at any desired position in the box. This box, as a whole, is carried upon vertical rack-bars $a^{16}$, sliding in the frame-work of the machine and meshing with pinions $a^{17}$. By turning these pinions the entire feed-box may be raised and lowered, as desired, to bring the center of the pieces of leather opposite to the calipers. A pawl and ratchet $a^{18}$ $a^{19}$ serve to hold the box in the position given to it. The sides $a^{13}$ $a^{13}$ are mounted upon the bottom by arms which extend through slots cut crosswise in said bottom, and these arms are provided at their lower extremities with nuts which engage screws $a^{20}$ $a^{20}$. Each of these screws has a right-and-left-handed part, and both screws are geared together by beveled pinions to the shaft $a^{21}$, which has a hand-wheel $a^{22}$, by means of which the sides $a^{13}$ $a^{13}$ may be brought together or carried apart from each other to suit different-sized pieces.

Carried upon a stud at the open end of the feed-box (see Figs. 7 and 8) are adjustable bars $a^{23}$, attached to the upright stud by means of a collar and set-screw, so that they may be vertically adjusted to suit different-sized pieces of leather. It is against these bars $a^{23}$ that the front piece of the row of sole-leather pieces is pressed by the screw-follower, and this front piece is supposed to be in position to be fed into the caliper. A top bar $a^{24}$ may also be applied if there is any tendency of the pieces to rise and slip out of position.

Spring feeding-fingers $a^{25}$ $a^{25}$, having a reciprocating motion across the end of the feed-box, are provided for the purpose of feeding the leather into the jaws of the calipers. The ends of these feed-fingers (see detail Figs. 16, 17, and 18) are provided with sharp spikes $a^{26}$, which penetrate the surface of the leather to give the fingers a secure hold. It should be remarked that in placing the pieces of leather in the feed-box the pieces are arranged with the flesh and grain side of the leather all the same way and the flesh side in front, so that it will receive the thrust of the spiked fingers. The reason for employing two spiked fingers is that they may be adjusted farther apart or nearer together, and that there being two points of engagement with the leather the latter is not likely to be tilted in the operation of feeding.

In addition to the spike $a^{26}$ on the end of each finger, I prefer to put a second pivoted spike $a^{27}$, which is held in position by a spring $a^{28}$. When the fingers engage the leather, this pivoted and yielding spike turns on its pivot slightly and is forced thereby squarely into the leather, and this tends to prevent the other spike from scratching along the surface of the leather and secures a good firm hold.

The fingers are mounted upon the vertical rock-shaft $a^{29}$ by means of the collar $a^{30}$, which is held in place by a set-screw $a^{31}$. Upon this collar is a movable ring $a^{32}$, which carries the finger $a^{25}$. A spring $a^{33}$ between the finger and the collar $a^{30}$ serves to hold the finger up to its work with a yielding pressure. The upper end of the rock-shaft $a^{29}$ moves in the slot $a^{34}$, formed in the slotted bar $a^{35}$. (See Figs. 1 and 7.) This slot permits the rock-shaft to move in a linear as well as a rotary direction. The lower end of the rock-shaft $a^{29}$ is attached to the sliding bar $a^{36}$. The other end of this bar connects with the heart-cam $a^{37}$, (see Fig. 14,) which is mounted upon and revolved by the central shaft A. The revolution of the shaft A carries this heart-cam and imparts to the bar $a^{36}$ a rectilinear reciprocation—one stroke of the bar to each revolution of the cam and shaft. It is this reciprocating movement which carries the spiked fingers across the face of the feed-box and forces the foremost piece of leather edgewise into the jaws of the caliper.

In order that the spiked fingers in their return-stroke shall not drag over the leather, the following mechanism is provided: To the lower end of the rock-shaft $a^{29}$ is attached a rigid arm $a^{38}$, carrying at its end a pin $a^{39}$. This pin in the forward feeding movement of the fingers underrides the cam-plate $a^{40}$, which is pivoted at $a^{41}$ and depressed at its farther end by the spring $a^{42}$. The underriding pin raises this cam-plate to push it out of the way in the feeding movement; but in the return movement the spring will have replaced the cam-plate $a^{40}$ in position, so that the pin $a^{39}$ will engage its edge, and riding on the edge the arm $a^{38}$ is swung and the rock-shaft $a^{29}$ thus rotated partially, causing the fingers to be carried back in a different path away from the leather until the end of the cam-plate $a^{40}$ is reached, when the spring $a^{43}$ comes into play and throws the spike ends of the fingers forcibly against the leather. The surface of the leather, especially on the flesh side, is by no means smooth, and any inequalities, curvatures, &c., are extremely likely to be present, causing the pieces of leather to adhere together under the pressure with considerable firmness, and as these pieces are of different thicknesses and not always flat it is found best to provide a gateway or opening for their exit from the box so large that it is possible for two pieces of leather to escape side by side, the one that is being fed dragging its next neighbor partly out.

To prevent the complete expulsion of this next adjacent piece, and at the same time to permit the entire discharge of the foremost piece, a spring-gate $a^{44}$ is provided. The free end of this gate is slightly curved to permit the easy passage of the foremost piece of leather, and a spring $a^{45}$ tends to keep the gate constantly closed. When the foremost piece of leather has been thrust by the action of the feeding-fingers into the caliper-jaws, the next piece, as above indicated, will be partly thrust out of the box, its emergence being resisted by the spring-gate, however, so that it does not escape far. In order that this next piece may be properly fed, so as to be grasped centrally by the calipers, it is necessary that it should be returned to position in the box, so that it may be grasped tightly by the feeding-fingers in their next thrust; and to provide a positive means to effect the closing of the gate for this purpose is the object of the toggle-jointed lever $a^{46}$, one end of which sets against the gate and the other end of which is pivoted to the frame-work of the machine. The straightening of this lever closes the gate. It is operated as follows: The vertical rock-shaft $a^{47}$ carries at its upper end an arm $a^{48}$, which engages the toggle-lever, and at its lower end an arm $a^{49}$, a depending pin from which lies in the path of the spring-dog $a^{50}$, mounted on the reciprocating bar $a^{36}$. In the forward or feeding movement of this bar $a^{36}$ the spring-dog $a^{50}$ snaps by the depending pin on the arm $a^{49}$; but in the retreating movement of said bar $a^{36}$ the dog $a^{50}$ engages said arm $a^{49}$ and operates it to straighten the toggle-lever and close the gate positively, forcing the partially-fed piece back into position. The spring $a^{51}$ holds the rock-shaft in proper position for action. Guide-surfaces $a^{52}\ a^{52}$ extend in a vertical plane from the gate, so that the piece of leather will have a bearing-surface to rest against, and it is held against this surface by the thrust of the fingers. It is between these two parts $a^{52}$ that the caliper stands when it receives the piece of leather. By this feeding mechanism the pieces of leather are fed at regular times and stated intervals a certain fixed distance with great accuracy and certainty into the jaws of the calipers, the series of which are made to pass at like intervals of time into position to receive said pieces.

The mechanism for carrying the calipers and for operating the same will now be described. Mounted to revolve loosely upon the shaft A is a ring B, connected to a suitable central hub by means of arms $b$, and having supporting-rollers $b'$, which run upon a circular track $b^2$ on the frame C of the machine, whereby said carriage or ring may run freely and easily.

Attached to the carriage is the hub D or hub-shaft, carrying at its lower end a commutator E and at its upper end the ratchet-wheel F. This ratchet-wheel is shown more clearly at Fig. 13, and it consists of a wheel cut at regular intervals with square teeth $f$, between each pair of which is the double-beveled space $f'$. A short vertical shaft $f^2$, that receives motion from the same series as the shaft A, (see Figs. 13 and 2,) is provided with a crank-arm $f^3$, attached to a pitman $f^4$, which in turn is pivoted to swing arm $f^5$, loosely pivoted upon the shaft A. Pivoted to the arm $f^5$ is a pawl $f^6$, one end of which is furnished with a plate $f^7$, conforming in shape to the double-beveled space $f'$, and this end of the pawl is held toward the ratchet-wheel by the spring $f^8$. The other end $f^9$ of the pawl $f^6$ is extended backward far enough to come into the path of the crank $f^3$ as it revolves. At each revolution of the crank $f^3$ the end $f^9$ of the pawl $f^6$ is struck by the crank and the other end of the pawl thereby moved out of contact with the ratchet. The farther sweep of the crank carries the pitman $f^4$, the arm $f^5$, and the pawl $f^6$ bodily backward the distance of one space on the ratchet, and the spring $f^8$ causes the pawl to engage the ratchet-wheel at the next space, the double-beveled concave surface $f^7$ engaging with the double-beveled convex surface $f'$, the two bevels causing the ratchet-wheel to adjust itself exactly to position. The farther revolution of the crank in the opposite direction moves the whole apparatus, wheel and all, forward a certain definite distance, and the operation is repeated stroke by stroke, the result being that the carriage is intermittently revolved through a certain definite distance at each revolution of the shafts A and $f^2$.

Mounted upon the ring B at regular intervals and projecting radially outward therefrom is a series of caliper-nippers G. These consist of a stationary jaw or arm $g$, rigidly secured to the ring, and a movable or pivoted arm $g'$. In each jaw is a friction-roller $g^2$, and it is between these two rollers that the measurement is effected and the piece of leather held. The movable arm $g'$ has a rearward extension $g^3$, reaching in toward the center of the wheel in a somewhat tangential direction. The arm $g'$ has also an angular extension $g^4$, which carries an armature $g^5$ of an electro-magnet E', so placed that the attraction of the armature toward the magnet will cause the jaws of the nipping-caliper to open. It is beneath these calipers and connected to the ring B through the stationary part thereof that the rollers $b'$ are carried, resting upon the track $b^2$ above alluded to. The series of calipers may be any desired number, such number being employed, or the movement of the machine so adjusted and timed, that at every intermittent movement of the carriage one of the calipers will be presented at the feed-gate and will stand in the opening between the two surfaces or guides $a^{52}$ in position to receive the piece of leather thrust edgewise into the jaws between the rollers $g^2$. The rearwardly and inwardly extending arms $g^3$ are given two bends—one a vertical bend and the other a horizontal bend—so that they may be moved to the necessary extent to open and close the jaws without interfering with each other.

Upon the interior stationary table, which, for convenience of insulating the various electrical contrivances placed upon it, is preferably made of some insulating material, as vulcanite, are placed a series of electrical contact-pieces $E^2$. These pieces are arranged upon a table H in a spiral line and at regularly-increasing distances from the center. Outside of the carriage which carries the calipers around with intermittent rotary movement, and beneath the jaws of the calipers and corresponding in number to the contact-pieces and calipers, are located a series of bins J. The piece of leather fed between the nipping-jaws of the calipers is carried forward by the rotation of the machine step by step, the inwardly-extending arm $g^3$ of the caliper having a position determined by the thickness of the piece of leather between the jaws until the inner end of the said extended arm $g^3$ comes in contact with some one of the series of contact-points, and of course that particular one which stands at the right distance to meet the arm. This contact closes an electric circuit which energizes the electro-magnet belonging to its caliper and, attracting its armature, causes the caliper to open and drop the piece of leather from its grasp. The piece of leather falls into the bin immediately, which is that compartment devoted to the particular thickness of the piece dropped.

The electrical appliances and circuits made use of and shown in the drawings are as follows:

The commutator E, carried upon the central shaft A and revolving continuously therewith, is furnished with a number of conducting-surfaces equal in number to the number of calipers and bins, which conducting-surfaces are in electrical contact with the shaft A and insulated from each other by intervening strips of non-conducting material. $E^3$ is the brush of the commutator. $E^4$ is the battery, or dynamo.

The circuits are run as follows: From one pole of the battery—say the positive pole—a wire $e$ leads to the brush $E^3$ of the commutator. From the core or shaft of the commutator a wire $e'$ is taken to each of the electro-magnets. From each of the electro-magnets $E'$ a wire $e^2$, being the continuation of the wire $e'$, is led down the arm $g^3$ to a contact piece or plate $E^5$, where it terminates. From each of the contact-pieces $E^2$ is led a wire $e^3$, that is connected to a common base wire $e^4$, which may, if preferred, be the metal of the ring B. From the wire or base $e^4$ is led the wire $e^5$ to a spring contact-piece $E^6$, which is in contact with the contact-piece $E^7$, from whence is led the wire $e^7$ to the negative pole of the battery or source of electrical supply. From the contact-piece $E^6$ is led the wire $e^8$ to the electro-magnet $E^8$ and back by the wire $e^9$ to the contact-piece $E^7$. The function of the magnet $E^8$ and the circuit which connects it with the general circuit just described is to operate a counting mechanism consisting of an ordinary mechanical counter, (shown at K in Fig. 2,) one of which is located in each bin. The armature of the magnet $E^8$ is carried upon or attached to the operating-lever of the mechanical counter, and when the magnet is energized and attracts its armature the lever of the counter is thereby operated, and these counters are operated by the circuit to count each piece of leather that is dropped in the particular bin where it is located, as follows: As the arm of the caliper makes contact with the contact-piece $E^2$ and the jaws of the caliper are opened said arm is carried outward by the opening of the caliper and is brought into touch with the spring-switch $E^6$ opening the same, which causes the circuit to flow around through the magnet $E^8$, from which magnet current had previously been shunted by said normally-closed switch $E^6$ to the contact-point $E^7$. It will be observed that the electrical contact between the end of the arm and the piece $E^2$ is necessarily only momentary, and it is not desirable that a long or dragging contact at this point should be made, both on account of the wear and on account of the liability of sparking. In order, therefore, to give more time to the action of the magnet which opens the jaws of the calipers, provision is made for an automatic shunt-circuit at each magnet, as follows: From the wire $e^2$ is led a wire $e^{10}$ to a supplemental armature $e^9$, in front of which is placed a contact-piece $E^{10}$, from which latter is led a wire $e^{11}$, connected to the common base or wire $e^4$.

The action is as follows: When the arm $g^3$ has made contact and the magnet $E'$ is energized and its main armature operated to open the jaws of the caliper simultaneously, the supplementary armature $e^9$ is drawn toward this magnet and contact is made between it and the contact-point $E^{10}$, and when the contact between the beveled end of the arm $g^3$ and the contact-piece E² is broken the circuit continues to flow through the magnet E′ by reason of the contact between the armature e⁹ and the point E¹⁰, the circuit being led in that case back to the common base e⁴ by way of the wire e¹⁰ e¹¹, instead of by way of the wire e³. This arrangement confines all of the sparking and long dragging contacts to the brush of the commutator.

The contact-pieces E² are made in the form of an angle-arm, so that they may more readily yield away from the push of the arm g³. They are held in position by a spring E¹¹, and have at their extreme end a wedge-shaped upwardly-projecting contact-surface E¹², against which the beveled contact-plate E⁵ on the arm g³ strikes. Thus little friction is encountered and little tendency to vibrate is occasioned by and in the arm g³. To counteract the action of the magnet upon the caliper, and to hold the caliper-jaws closed with a yielding pressure, springs G′, lying in a horizontal direction, connect the arm g³ with the frame-work of the carriage at an inner point. The vertical dependent springs (seen at G²) connecting the ends of the arms g³ to the ratchet-wheel are intended simply to steady the arms g³ and counteract any tendency to vibrate in the same upon their pivots.

To insure the discharge of all pieces of leather from the calipers in case an extra thick piece should happen to be fed into one of the calipers so thick that it cannot be measured, or in case the circuit should be broken at any point, there is provided upon the table H a roller H′, so located that after the nippers have passed the final bin each arm g³ will come in contact with this roller and its caliper mechanically forced open, and whatever may be in the jaws dropped with absolute certainty before each caliper reaches the point where the feed mechanism is located.

I claim—

1. In a machine for measuring the thickness and assorting pieces of leather, consisting of a series of calipers arranged to move in a path, and a series of contact-points arranged at intervals along said path and at different distances therefrom, constructed to open the jaws of the calipers by contact therewith, substantially as specified.

2. In a machine for measuring the thickness and assorting pieces of leather, the measuring-caliper contrived to be moved along a path provided with contact projections arranged at intervals along the path and at different distances therefrom, and an arm from the caliper, the position of which depends upon the thickness of the material held in the caliper-jaws and which is carried along the line of contact projections, substantially as specified.

3. In a machine for measuring the thickness and assorting pieces of leather, the calipering-holder having a jointed jaw, and an extension thereof, the position of which extension is the index of the thickness of the material within the jaw, the whole being constructed to move along a certain path, in combination with projections arranged along said path at intervals and at different distances from said path, into contact with one of which projections the index-arm may come and operate said arm to open the jaw and release the material gripped and measured therein, substantially as specified.

4. In a machine for measuring the thickness and assorting pieces of leather, the calipering-holder having a jointed jaw, and an extension thereof, the position of which extension is the index of the thickness of the material within the jaw, the whole being constructed to move along a certain path, in combination with projections arranged along said path at intervals and at different distances from said path, into contact with one of which projections the index-arm may come and operate said arm to open the jaw and release the material gripped and measured therein, an electro-magnet, the armature of which is connected to the caliper, an electric circuit, including said magnet, which is brought into action to energize the same by contact between said index-arm and one of said projections, substantially as specified.

5. In a machine for measuring the thickness and assorting pieces of leather, a series of gripping-calipers mounted upon a carriage at regular intervals from each other to move around in a path returning upon itself, said calipers each having a projecting index-arm, the position of which is determined by the thickness grasped in the caliper, in combination with series of projections arranged along the path at intervals and at varying distances from said path in such position that one of such projections may be encountered by each index-arm to cause the opening of the calipers and discharge what they hold, substantially as specified.

6. In a machine for measuring the thickness and assorting pieces of leather, a series of gripping-calipers mounted upon a carriage at regular intervals from each other to move around in a path returning upon itself, said calipers each having a projecting index-arm, the position of which is determined by the thickness grasped in the caliper, in combination with a series of projections arranged along the path at intervals and at varying distances from said path in such position that one of such projections may be encountered by each index-arm to cause the opening of the calipers and discharge what they hold, said carriage having an intermittent movement, substantially as specified.

7. In a machine for measuring the thickness and assorting pieces of leather, a series of gripping-calipers mounted upon a carriage at regular intervals from each other to move around in a path returning upon itself, said calipers each having a projecting index-arm, the position of which is determined by the thickness grasped in the caliper, in combination with a series of projections arranged along the path at intervals and at varying distances from said path in such position that one of such projections may be encountered by each index-arm to cause the opening of the calipers and discharge what they hold, said carriage having an intermittent movement, and a feed device timed and constructed to thrust the articles to be measured into the jaws of the calipers when the same are stationary, substantially as specified.

8. In a machine for measuring the thickness and assorting pieces of leather, the feed-box for feeding pieces of sole-leather to a calipering-machine, consisting of a trough or box having adjustable sides which can be set to or from a center line and constructed so that the whole may be raised or lowered bodily, substantially as specified.

9. In a machine for measuring the thickness and assorting pieces of leather, the feed box or trough provided with a screw-shaft in the bed thereof, driven by friction from a power-shaft and having a platen or follower carried by a nut engaged by said screw, substantially as specified.

10. In a machine for measuring the thickness and assorting pieces of leather, the feed box or trough provided with a screw-shaft in the bed thereof, driven by friction from a power-shaft and having a platen or follower carried by a nut engaged by said screw, said nut being a half-nut and adapted to be disengaged from said screw to enable the setting of the follower back in charging the box with the material to be fed, substantially as specified.

11. In a machine for measuring the thickness and assorting pieces of leather, the combination, with a calipering-machine, of the feed-box constructed to hold the pieces of leather upright in a row and feed the same forward, abutment or stop-bars standing across the end of the box, and spiked feeding-fingers which engage the foremost piece with a reciprocating rectilinear movement and thrust the same centrally into the jaws of the caliper, substantially as specified.

12. In a machine for measuring the thickness and assorting pieces of leather as a means for imparting accurate intermediate rotary movement to the caliper-carriage, the ratchet-wheel F, having teeth $f$, and the double-beveled spaces $f'$, in conjunction with a pawl having a double-beveled contact-surface $f^7$, substantially as specified.

13. In a machine for measuring the thickness and assorting pieces of leather as a means for imparting accurate intermediate rotary movement to the caliper-carriage, the ratchet-wheel F, having teeth $f$, and the double-beveled spaces $f'$, in conjunction with a pawl having a double-beveled contact-surface $f^7$, mounted upon the swinging arm $F^5$, having the rearward projection $f^9$, and held to its work by the spring $f^8$ and actuated by the crank $f^3$, connected to the swinging arm $f^4$, substantially as specified.

14. In a machine for measuring the thickness and assorting pieces of leather, the measuring-calipers, the jaws of which are provided with parallel rollers $e^2$, substantially as specified.

15. In a machine for measuring the thickness and assorting pieces of leather, the feed-box, out of the end of which the pieces of leather are thrust laterally, in combination with a spring-gate which yields as the leather is forced out and is carried back positively by the feed-operating mechanism in its return-stroke to carry back to position any partially-fed pieces which may have been borne out by frictional contact of the fed piece, substantially as specified.

16. In a machine for measuring the thickness and assorting pieces of leather, the combination, with the revolving carriage, the calipers mounted thereon, and the stationary contact-pieces mounted on the table H in the path of the index-arm, of the calipers, the commutator mounted upon the hub of the carriage, the brush mounted on the stationary table, the electro-magnets E', the armatures whereof are attached to the jaws of the calipers, the prolonged index-arms $g^3$ of said calipers, the yielding contact-pieces $E^2$, the battery or source of electrical supply $E^4$, and the circuit $e$ $e'$ $e^2$ $e^3$ $e^4$ $e^5$ $e^7$, substantially as specified.

17. In a machine for measuring the thickness and assorting pieces of leather, the combination, with the revolving carriage, the calipers mounted thereon, and the stationary contact-pieces mounted on the table H in the path of the index-arm, of the calipers, the commutator mounted upon the hub of the carriage, the brush mounted on the stationary table, the electro-magnets E', the armatures whereof are attached to the jaws of the calipers, the prolonged index-arms $g^3$ of said calipers, the yielding contact-pieces $E^2$, the battery or source of electrical supply $E^4$, the circuit $e$ $e'$ $e^2$ $e^3$ $e^4$ $e^5$ $e^7$, the counters K, magnets $E^8$, spring-switch $E^6$ $E^7$, and loop-circuits $e^8$ $e^9$, substantially as specified.

18. In a machine for measuring the thickness and assorting pieces of leather, the combination, with the revolving carriage, the calipers mounted thereon, and the stationary contact-pieces mounted on the table H in the path of the index-arm, of the calipers, the commutator mounted upon the hub of the carriage, the brush mounted on the stationary table, the electro-magnets E', the armatures whereof are attached to the jaws of the calipers, the prolonged index-arms $g^3$ of said calipers, the yielding contact-pieces $E^2$, the battery or source of electrical supply $E^4$, the circuit $e$ $e'$ $e^2$ $e^3$ $e^4$ $e^5$ $e^7$, the supplementary armatures $e^9$ of the magnets E', and the circuits $E^{10}$ $E^{11}$, substantially as specified.

19. In a machine for measuring the thickness and assorting pieces of leather, in combination with the carriage having a series of calipers operated to discharge the measured article gripped therein by contact with an index-arm connected to the jaw with one of a series of projections located near the path of the machine, the final discharge cam or roller H', for mechanically opening all of the jaws widely at a certain point in the rotation of the carriage by contact of said arms with said cam-wheel, substantially as specified.

FORÉE BAIN.

Witnesses:
H. M. MUNDAY,
EDW. S. EVARTS.